United States Patent [19]
Caldecourt

[11] 3,857,094
[45] Dec. 24, 1974

[54] ELECTRICAL BRIDGE ELEMENT ASSEMBLY FOR CORROSION MEASUREMENT

[75] Inventor: Victor J. Caldecourt, Midland, Mich.

[73] Assignee: The Dow Chemical Company, Midland, Mich.

[22] Filed: Jan. 2, 1974

[21] Appl. No.: 430,309

[52] U.S. Cl............ 324/65 CR, 73/86, 204/1 T, 204/195 C
[51] Int. Cl............................................ G01r 27/02
[58] Field of Search ........ 324/65 CR, 71 E; 338/13; 73/86; 204/1 T, 195 C; 23/230 C

[56] References Cited
UNITED STATES PATENTS

| | | | |
|---|---|---|---|
| 2,991,439 | 7/1961 | Marsh et al. | 324/65 CR |
| 3,123,789 | 3/1964 | Schaschl et al. | 324/65 CR |
| 3,153,217 | 10/1964 | Cramer et al. | 324/65 CR |
| 3,197,698 | 7/1965 | Schaschl et al. | 324/65 CR |
| 3,358,229 | 12/1967 | Collins | 324/65 CR |

Primary Examiner—Stanley T. Krawczewicz
Attorney, Agent, or Firm—Earl D. Ayers

[57] ABSTRACT

The invention comprises an electrical bridge element assembly wherein a thin metal strip is folded together to provide two arms of the bridge, one arm of which is split along at least a substantial part of its length. The arms are spaced apart from each other except at their common folded end by electrically insulation means which is bonded to the adjacent surfaces of each arm. The element is encased in housing wherein only one surface of the unsplit arm is exposed to be corroded. Electrical leads are coupled to the ends of the arm parts whereby the element may function as two resistance arms of an electrical bridge circuit.

8 Claims, 5 Drawing Figures

ELECTRICAL BRIDGE ELEMENT ASSEMBLY FOR CORROSION MEASUREMENT

BACKGROUND OF THE INVENTION

This invention relates to electrical bridge element assemblies and particularly to such assemblies which are temperature compensated and which are adapted for use in making corrosion measurements.

Bridge element assemblies for use in the measurement relating to corrosive conditions are known, but are not as well temperature compensated, expensive, are not as sensitive to the effects of exposure to corrosive materials, or a combination of these problems.

OBJECTS OF THE INVENTION

A principal object of this invention is to provide an improved electrical bridge element assembly for use in corrosion measurements.

Another object of this invention is to provide an improved, sensitive, thin electrical bridge element assembly for use in making corrosion measurements.

A further object of the invention is to provide an improved, temperature compensated electrical bridge assembly for use in making corrosion measurements.

An additional object of this invention is to provide an improved, rugged and relatively inexpensive electrical bridge element assembly for use in making corrosion measurements.

STATEMENT OF INVENTION

In accordance with this invention, there is provided an electrical bridge element assembly wherein a thin metal strip is folded so that two generally axially aligned arms are provided, one of said arms being bifurcated along at least a substantial part of its length. The arms are bonded together to provide good heat transfer, but are electrically insulated from each other except at their common folded end. The element is encased in housing wherein one surface of the unsplit arm is exposed to the corrosive atmosphere or liquid and the remainder of the element is shielded from such exposure. Electrical leads are coupled to the ends of the arm parts whereby the element may function as two resistance arms of an electrical bridge circuit.

BRIEF DESCRIPTION OF THE DRAWING

The invention, as well as additional objects and advantages thereof, will best be understood when the following detailed description is read in connection with the accompanying drawing, in which.

DETAILED DESCRIPTION OF THE DRAWING

Figure 1:
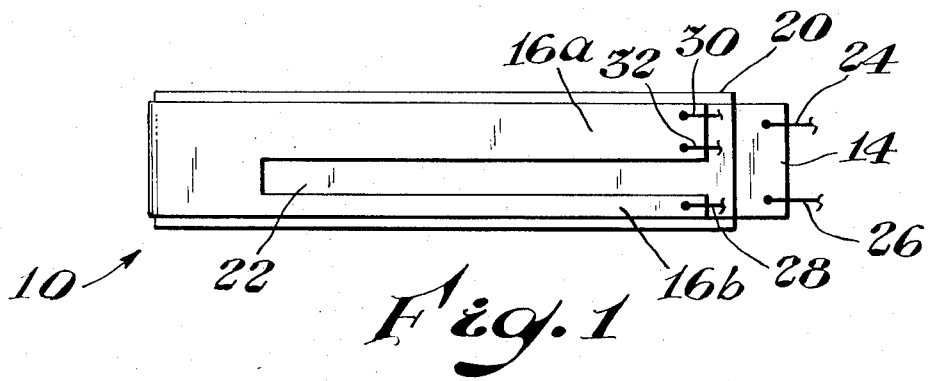
FIG. 1 is a plan view of a bridge resistance member in accordance with this invention.
Figure 2:
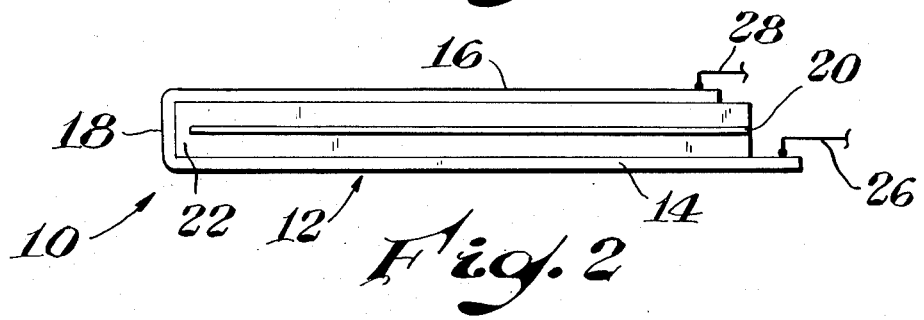
FIG. 2 is a side elevational view of the resistance member shown in FIG. 1.

Referring to the drawing, and particularly to FIGS. 1 and 2, there is shown an electrical bridge member, indicated generally by the numeral 10, composed of an elongated thin strip 12 of metal, commonly steel, which is folded back on itself so that its two ends are disposed adjacent to each other to form arms of the bridge element 14, 16. One arm 16 is slotted to provide branches 16a, 16b. The branch 16a serves as a resistance element and the branch 16b serves as an electrical lead to the junction between the branch 16a and the remainder of the arm 16 and arm 14, which constitutes a second resistance element. The strip could have been folded at the end of the slot between branches 16a and 16b in which case arm 14 alone would constitute the second resistance element of the assembly.

The arms 14, 16 are separated (except at their common end 18) by a layer 20 of electrically insulating material, commonly porous paper impregnated with a resin. The arms 14, 16 are bonded to the sheet-like layer 20 by epoxy resin 22, for example. The layer 20 is necessary, if the separation between the arms 14, 16 is to be very small, to prevent electrical short circuiting between the arms as they are pressed together to be bonded with the resin 22. The layer 20 is usually, for assembly convenience, slightly wider and longer than the arm 16.

Figure 3:
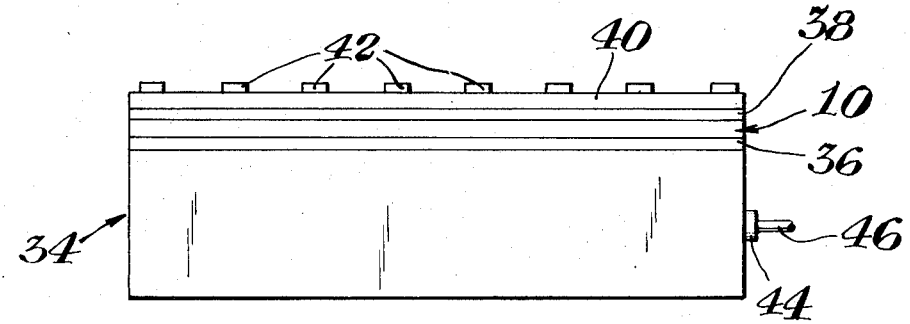
FIG. 3 is a side elevational view of a bridge member of the type shown in FIG. 1 which is encased in a suitable housing.
Figure 4:
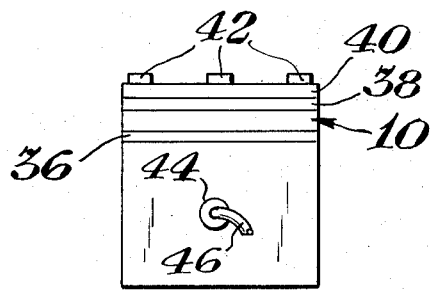
FIG. 4 is an end view of the apparatus shown in FIG. 3.
Figure 5:
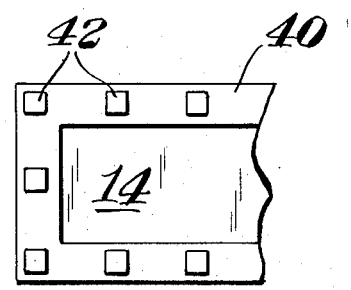
FIG. 5 is a fragmentary plan view of the apparatus shown in FIG. 3.

Referring now to FIGS. 3, 4 and 5, the bridge member 10 is disposed in a box-like housing member 34 having an open top. A strip of flexible gasket material 36 fits around the top edge of the box. The member 10 is disposed over the top of the housing member 34, its edges contacting the gasket material 36. Another gasket 38 fits around the edges and is disposed on top of the bridge member 10.

A compression plate 40 having an open center part fits over the edge part of the housing member 34, and is secured to the member 34 by screws 42.

The bridge member 10 is thus held compressed between the edge sealing gaskets 36, 38, with the arm 16 protected against corrosion by the interior of the housing. One surface of the arm 14 is exposed to any corrosive atmosphere.

Electrical leads 24, 26, 28, 30, 32 to make connections to a Kelvin bridge circuit, for example, are brought through a seal 44 in the end of the housing member 34 by cable 46.

The arms 14, 16 are made of a thin corrodible metal. Steel shim stock, two mils thick, was used in one device. The layer 20 may be thin, porous paper and the resin 22 may be epoxy resin. In one example where two mil shim stock was used for the arms 14, 16, the total thickness of the layer 20 and resin 22 was 9 mils.

The thickness of the layer 20 and resin 22 should be as small as is practical in order to provide fast heat transfer from the exposed arm 14 to the protected arm 16.

It is possible, too, to coat the entire bridge member 10 with a corrosion-resistant material except for the surface of the arm 14 which is to be exposed to the liquid or gas corrosive material. An epoxy resin coating may be used, for example. The thickness of the arms 14, 16, as a practical working range may vary between one and 10 mils.

To improve heat transfer between the arms 14, 16, it is practical to add particulated aluminum oxide or beryllium oxide to the resin used. Any sheet-like mesh, for example, which would prevent electrical shorting between the arms 14, 16 can be substituted for a paper layer.

What is claimed is:

1. An electrical bridge member assembly for use in making measurements of corrosivity of a fluid, comprising a thin strip having at least one metal surface, said strip being folded back on itself to form two arm parts, one arm being split along at least a substantial part of its length, said arms being spaced apart and bonded to electrically insulating heat transfer means which is in layer-like form, said heat transfer means extending from adjacent to the common end of said arms to at least the other end of one of said arms, means for electrically coupling said assembly to external bridge measurement apparatus, and means for shielding all but one surface of one of said arms from said fluid.

2. An assembly in accordance with claim 1, wherein said heat transfer means comprises an organic resin.

3. An assembly in accordance with claim 1, wherein a surface of said unsplit arm is exposed to said fluid.

4. An assembly in accordance with claim 1, wherein said shielding comprises a box-like member wherein said one surface of one of said arms is positioned as a part of the top of said box-like member.

5. An assembly in accordance with claim 1, wherein said heat transfer means includes a layer of porous sheet-like electrically insulating material.

6. An assembly in accordance with claim 1, wherein said strip is between one and 10 mils in thickness.

7. An assembly in accordance with claim 1, wherein said heat transfer means is an epoxy resin.

8. An assembly in accordance with claim 1, wherein said heat transfer means is from one to six times the thickness of said strip.

* * * * *